Figure 1:
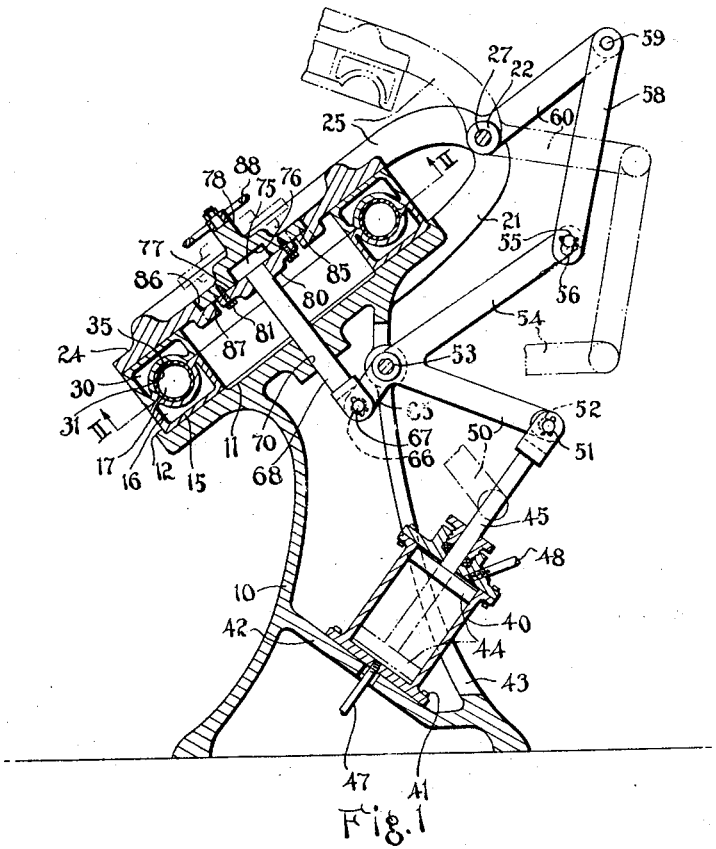

Oct. 25, 1932.    R. W. SNYDER    1,884,324

VULCANIZING APPARATUS

Filed Aug. 1, 1929

Inventor
Robert W. Snyder

By

Attorney

Patented Oct. 25, 1932

1,884,324

UNITED STATES PATENT OFFICE

ROBERT W. SNYDER, OF AKRON, OHIO, ASSIGNOR TO THE GOODYEAR TIRE & RUBBER COMPANY, OF AKRON, OHIO, A CORPORATION OF OHIO

VULCANIZING APPARATUS

Application filed August 1, 1929. Serial No. 382,608.

This invention relates to an apparatus for vulcanizing inner tubes for pneumatic tires and it has particular relation to an apparatus of this character comprising a pair of circular mold sections which are movably connected at one point adjacent their arcuate edges.

An object of the invention is to provide an apparatus of the type designated wherein the sections are retained together during their operation by a locking mechanism disposed centrally of the mold sections, thereby positively preventing pressure within the mold from moving the sections relatively.

Another object of the invention is to provide an apparatus of the type described wherein the aforesaid locking mechanism is operated by a means employed for moving the sections relatively thereby requiring the employment of a single power operating mechanism.

At the present time, inner tubes for pneumatic tires are manufactured by first forming the tube endless and then disposing it between a pair of mold sections having complementary cavities for receiving the tube. These molds frequently are termed "watch case heaters" by reason of the fact that the sections are pivotally connected adjacent one edge similarly to the sections of a watch case. During the vulcanizing operation, the inner tube is inflated with fluid under high pressure, which is sufficient to facilitate separation of the sections about their pivotal connection, because of the relatively great distances from the pivot, that pressures at various points within the mold are exerted. Locks have been provided for positively preventing separation of the sections during the curing operation, as, for example, bolts and lugs connecting the sections at the sides thereof diametrically opposed with respect to their pivotal connection. Following the curing operation, the bolts were released and a power means operatively connected to a movable section of the mold was employed to separate them in order that the vulcanized inner tube could be removed from between the mold sections.

According to this invention, a locking device is provided for retaining the sections of the mold in their operative positions which is operated by a power means employed for moving the sections relatively about their pivotal connections. This device comprises a rod slidably projecting through the center of one of the sections, which is provided with a movable head having radially projecting lugs adapted for locking engagement with other lugs on the other mold section. The latter lugs are spaced circumferentially about an opening in the last mentioned section and when the section is moved to its operative position, the head on the rod is projected through the opening therein. A slight rotary movement of the head results in superposing of the lugs on the head with respect to the lugs on the one section. Movement of the rod toward the other sections effects a positive engagement of the lugs and consequently a secure assembly of the sections in their operative positions. The power means employed for operating the rod also has operative connection to a movable section of the mold for separating the sections after the curing operation. This latter connection includes a joint permitting such limited play that the sections may be positioned in their operative positions and the power means utilized further to move the rod and lock the sections together.

Figure 2:
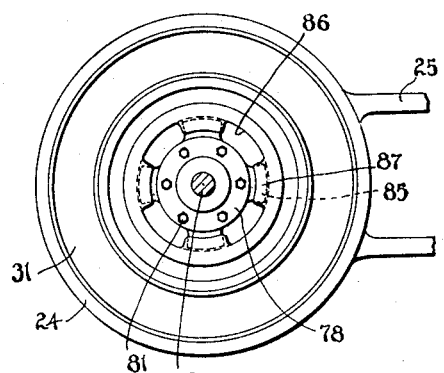

For a better understanding of the invention, reference may be had to the accompanying drawing, forming a part of the specification, in which:

Figure 1 is a cross-sectional view of a vulcanizing apparatus constructed according to this invention; and Figure 2 is a cross-sectional view taken substantially along the line II—II of Figure 1.

Referring to Figure 1, a hollow standard 10, is provided which, at its upper end, terminates in a plane face 11 inclined to the vertical approximately 40°. The face 11 is of circular shape and at its edge is provided with a circular rib 12. A circular mold section 15 is rigidly secured upon the face 11 and is positioned and retained thereon by the circular rib 12. This section is provided with a steam chamber 16 and a semi-tubular cavity 17 in its outer face.

The standard 10 also is provided with arms 21 extending upwardly from the upper end of the face 11 and terminating in apertured portions 22. A second mold section 24, which is of similar configuration to the section 15, is provided with arms 25 which are apertured similarly to the arms 21. These apertured portions of the arms 24 and 25 are connected by a pivot bolt 27. Like the section 15, the section 24 is provided with a steam chamber 30 and a semi-tubular cavity 31 complementary to the cavity 17. Conjointly, these cavities are adapted to receive therebetween an inner tube 35 for the purposes of vulcanizing the latter.

A fluid cylinder 40 is provided for moving the mold section 24 with respect to the section 15. This cylinder is secured by bolts 41 to an integral web 42 of the standard 10. One vertical wall of the standard 10 is provided with an elongate vertically extending recess 43 through which the cylinder 40 projects. The cylinder is provided with a conventional piston 44 rigid with a piston rod 45 projecting outwardly from the upper end of the cylinder. Fluid under pressure is admitted into the lower and upper ends of the cylinder by means of conduits 47 and 48, respectively. The end of the piston rod 45 opposite the piston 44 is pivotally connected to one end of an arm 50 by a pin 51 that is disposed in an elongate slot 52 provided in the end of the arm. The opposite end of the arm 50 projects into the elongate recess 43 in the standard 10 and is pivotally connected by a bolt 53 to an edge of the housing. A second arm 54, integral with the arm 50, at its outer end, is provided with a pin 55 that is disposed in an elongate slot 56 formed in one end of a link 58, the latter of which is pivotally connected by a pin 59 to an arm 60 integral with the arms 25 projecting upwardly from the mold section 24.

A third arm 65 projects from the arm 50 adjacent the pivot 53 but in a direction substantially opposite with respect to the arm 54. This arm is provided with an elongate slot 66 at its end opposite the pivot 53 through which a pin 67 loosely projects. In turn, the pin 67 projects through a bifurcated end of a rod 68 which is slidably mounted in an opening 70 formed centrally of the plane face 11 of the standard 10. The upper end of the rod 68 is provided with an integral circular head 75 which is rotatably disposed in a complementary recess 76 formed in the lower face 77 of a locking member 78. The head 75 is retained within the recess 76 by a cover 80 through which the rod 68 slidably projects and which is secured by bolts 81 to the lower face of the locking member.

As best shown by Figure 2, the locking member 78 is provided with circumferentially spaced radially projecting lugs 85, and is adapted to be projected through a circular opening 86 formed centrally of the upper mold section 24. In turn, the mold section 24 is provided with spaced radially inwardly projecting lugs 87 bordering the opening 86. A hand wheel 88 is securely fixed to the outer end of the locking member 78 for facilitating rotation of the locking member relative to the rod 68 and the head 75. When the locking member is in its operative position, it is projected through the opening 86 in the mold section 24 and so turned that the lugs 85 engage the outer faces of the lugs 87 on the mold section. Figure 1 illustrates the mold sections and the locking member in their operative positions.

When it is desired to separate the mold sections and remove an inner tube 35 disposed therebetween, fluid is admitted into the cylinder 40 through the conduit 48 for an instant of time sufficient to move the pin 55 on the arm 54 to the lower end of the slot 56 in the link 58. This results in a movement of the rod 68 and the locking member 78 outwardly and a slight spacing of the lugs 85 and 87 on the member 78 and the mold section 24, respectively. Then the hand wheel 88 is turned sufficiently to move the lugs 85 into positions between the lugs 87, thereby entirely disengaging the locking member 78 from the mold section 24. Fluid under pressure is again admitted to the conduit 48 which effects a movement of the upper mold section 24 to the broken line position shown by Figure 1. Also, this results in a slight movement of the rod 68 and the locking member 78 outwardly, but owing to the more rapid movement of the mold section 24 and the dimensions of the locking member 78, the mold section may be moved to its inoperative position without interference by the latter.

When it is desired to return the parts to their operative positions, fluid under pressure is admitted to the cylinder 40 through the conduit 47, while the arm 54 and the link 58 are so associated that the pin 55 is in the lower portion of the slot 56. Instead of admitting fluid through the conduit 47, the mold section 24 may be permitted to move to its operative position by gravity alone, during which movement the pin 55 remains in the lower portion of the slot 56 by reason of the fact that the link 58 is moving the arm 54 upwardly. This movement of the mold section 24 to its operative position results in such association of the locking member and the mold section that the lugs 85 are projected through the opening 86 in the mold section between the lugs 87 projecting inwardly from the edges of such opening. Then the hand wheel 88 is turned until the lugs 85 are disposed in alignment with the lugs 87. Further admission of fluid under pressure into the cylinder 40 through the conduit 47 results in further movement of the piston 44 outwardly which is permitted by reason of the slot 56. This further movement of the piston 44 outwardly results in movement of the rod 68 and the locking member 78 until the lugs 85 on the locking member 78 are firmly engaged with the lugs 87 on the upper mold section.

By providing an apparatus such as that described, it is apparent that the central portions of the mold sections are firmly retained together in their operative positions because the fluid under pressure admitted into the cylinder 40 through the conduit 47 exerts a great pressure against the piston, thereby retaining the rod 68 in its operative position in which the locking member 78 is firmly engaged with the mold section 24. However, when it is desired to separate the mold sections, it is apparent that the same fluid cylinder which retains the mold sections firmly in their operative positions is utilized first to release the locking member and then to separate the mold sections by moving the upper section about their pivotal connection 27. Thus a common power means is employed for moving the mold sections relatively and for securing them in their normally operative positions. It is apparent that, owing to the use of fluid pressure for operating the locking member 78, the mold section 24 may be retained against the mold section 15 by any force desired, depending upon the fluid pressure utilized.

Although I have illustrated but the preferred form of the invention and have described that form in detail, it will be apparent to those skilled in the art that the invention is not so limited, but that various modifications may be made therein without departing from the spirit of the invention or from the scope of the appended claim.

What I claim is:

A mold for treating articles under pressure comprising a pair of relatively movable mold sections, one of which is provided with a central opening having alternating recesses and lugs in its sides, a rod slidably projecting through the other of the sections and having a head rotatable with respect to the section, said head being provided with recesses and lugs complementary with respect to the lugs and recesses respectively in the first section, thereby providing a lock between the sections when the lugs on the head have been projected through the recesses in the first section and the head turned relative thereto, and means for moving the rod, said means also being connected to the sections for moving them relatively.

In witness whereof, I have hereunto signed my name.

Signed at Akron, in the county of Summit and State of Ohio, U. S. A., this 31st day of July, 1929.

ROBERT W. SNYDER.